(12) United States Patent
Sunderland Schanck (10) Patent No.: US 9,465,723 B2
(45) Date of Patent: Oct. 11, 2016

(54) SYSTEMS AND/OR METHODS FOR MONITORING LIVE SOFTWARE

(71) Applicant: Software AG USA, Inc., Reston, VA (US)

(72) Inventor: Christopher Robert Sunderland Schanck, Marriottsville, MD (US)

(73) Assignee: Software AG USA, Inc., Reston, VA (US)

( * ) Notice: Subject to any disclaimer, the term of this patent is extended or adjusted under 35 U.S.C. 154(b) by 0 days.

(21) Appl. No.: 14/524,359

(22) Filed: Oct. 27, 2014

(65) Prior Publication Data

US 2016/0117237 A1    Apr. 28, 2016

(51) Int. Cl.
G06F 11/36    (2006.01)
G06F 11/34    (2006.01)
G06F 9/44     (2006.01)

(52) U.S. Cl.
CPC ....... *G06F 11/3664* (2013.01); *G06F 11/3466* (2013.01); *G06F 11/362* (2013.01)

(58) Field of Classification Search
None
See application file for complete search history.

(56) References Cited

U.S. PATENT DOCUMENTS

| | | | | |
|---|---|---|---|---|
| 7,702,639 B2* | 4/2010 | Stanley | ............. | G06F 17/30286 707/999.1 |
| 7,703,045 B1* | 4/2010 | Kawahara | ............. | G06F 3/0486 715/769 |
| 2004/0133898 A1* | 7/2004 | Cherdron | ............. | G06F 8/20 719/332 |
| 2005/0273773 A1* | 12/2005 | Gold | ............. | G06F 8/34 717/139 |
| 2006/0144010 A1* | 7/2006 | Wolf | ............. | G06F 8/20 52/750 |
| 2008/0134152 A1* | 6/2008 | Edde | ............. | G06F 9/4428 717/135 |
| 2012/0162265 A1* | 6/2012 | Heinrich | ............. | G06Q 10/06393 345/661 |
| 2013/0205286 A1* | 8/2013 | Barraclough | ............. | G06F 8/443 717/151 |
| 2015/0113338 A1* | 4/2015 | Maruyama | ............. | G06F 3/06 714/48 |
| 2015/0268990 A1* | 9/2015 | Greene | ............. | G06F 9/5005 718/104 |

OTHER PUBLICATIONS

Wikipedia—Debugger, retrieved Oct. 27, 2014, 5 pages.
Wikipedia—Java Management Extensions, retrieved Oct. 27, 2014, 6 pages.

* cited by examiner

*Primary Examiner* — Daxin Wu
(74) *Attorney, Agent, or Firm* — Nixon & Vanderhye, P.C.

(57) ABSTRACT

Certain example embodiments described herein relate to techniques for observing an internal state of a software application executing in a runtime environment. For instance, certain example embodiments include traversing a structure of multiple live data objects in the executing software application; generating a graph of shadow data objects based on the traversing, with each shadow data object of the graph corresponding to a live data object of the executing software application; and providing access to the generated shadow graph via a user interface.

20 Claims, 9 Drawing Sheets

```
public shadowGraph() {
  Stack stack=new Stack()
  while(!stack.isEmpty()) {
          next=stack.pop();
          if(!seenBefore(next)) {
          if(shouldBeVisible(next)) {
              createShadowNode(next);
              if(isTraversable(next)) {
                      Object[] childObjects=extractChildObjects(next);
                      stack.addAll(childObjects);
                      }
              }
          }
      }
}
```

```
public main() {
        mainObject=new mainObject();
        shadowGraph.registerShadow(mainObject);
        mainObject.doSomething();
}
```

```
public shadowGraph() {
Stack stack=new Stack()
while(!stack.isEmpty()) {
        next=stack.pop();
        if(!seenBefore(next)) {
        if(shouldBeVisible(next)) {
                createShadowNode(next);
                if(isTraversable(next)) {
                        Object[] childObjects=extractChildObjects(next);
                        stack.addAll(childObjects);
                        }
                }
           }
     }
}
```

```
Set<ShadowNode> getChildrenOf(ShadowNodenode) {
        if(haveChildrenAlready(node)) {
                        return childRepository.get(node);
                        }
        if(isTraversable(node)) {
                        Object[] childObjects=extractChildObjects(node);
                        childSet=asSet(childObjects)
                        childRepository.put(node, childSet);
                        return childSet;
                }
}
```

```
updateUI(ShadowNode currentNode,ShadowNode parentNode) {
        ui.updateParent(parentNode);
        ui.updateObjectId(currentNode.toString());
        ui.updateObjectType(currentNode.getType());
        ui.updateObjectTimestamp(currentNode.getTimestamp());
        ui.clearAttributeTable();
        ui.clearChildrenTable();
        foreach attribute in shadowGraph.getAttributes(currentNode) {
                if(attribute.isPrimitiveType()) {
                        ui.addAttributeToTable(attribute);
                } else {
                        ui.addChildToTable(attribute);
                }
        }
}
```

```
...
parentNode = null;
currentNode=shadowGraph.getRootNode();
ui.updateUI(current Node,parentNode);
...
```

```
...
newNode=ui.getSelectedChild();
parentNode=currentNode;
currentNode=newNode;
ui.updateUI(current Node,parentNode);
...
```

SYSTEMS AND/OR METHODS FOR MONITORING LIVE SOFTWARE

TECHNICAL FIELD

Certain example embodiments described herein relate to techniques for computer software processing. More particularly, certain example embodiments relate to techniques for monitoring the state of live software.

BACKGROUND AND SUMMARY

Any running computer program (e.g., software system), at any point in time, can be represented as a directed graph of Abstract Data Types (ADT) and the connections between them. As is known, an Abstract Data Type is a complex data type that includes both data and references to other instances of abstract data types. During the runtime of a computer program, it is often helpful to be able to examine the state of the various ADTs and the relationships between them for various purposes, such as monitoring, debugging, and performance analysis. Exposing this information to an entity outside of the system itself (perhaps through a network or Graphical User Interface (GUI)) or within the system itself as a feedback mechanism, may be useful.

For production software systems, there are two conventional approaches to monitoring executing software. Full "debugging versions" of software can be run at the cost of significant performance degradation, as well as sometimes arbitrary changes in behavior. Alternatively, custom monitoring specific to the computer program under inspection can be written. This is understandably an inconsistent approach (e.g., due to code added to the program) and time-consuming process.

Many popular modern computer programming languages such as JAVA, PERL, C#, PYTHON, etc., are interpreted languages, meaning that they run within a well-defined runtime environment. One of the advantages of interpreted languages is that the runtime environments they run in provide support for the examination of code while the program is running, e.g., through a concept referred to as "reflection" or "introspection". Embodiments disclosed herein use capabilities such as reflection and introspection to implement novel techniques for monitoring the live structure of running programs.

An example embodiment provides a system for observing an internal state of a software application executing in a runtime environment. The system comprises processing resources including memory and at least one processor. The processing resources are configured to perform operations comprising traversing a structure of a plurality of live data objects in the software application executing in the runtime environment, and generating a graph of shadow data objects based on the traversing, each shadow data object of the graph corresponding to a live data object of the executing software application. The operations also include providing access to the generated shadow graph via a user interface.

In certain example embodiments the at least one processor is further configured to perform the generating including forming each shadow object to include metadata associated with, and a pointer to, a respective corresponding live data object.

The metadata may include aspects of naming of the corresponding live data object and/or identification of aspects of packaging of the corresponding live data object.

Each shadow data object in the graph may include a marking identifying whether the shadow object is exposable to the user interface. The providing access may include providing access to attributes of only shadow data objects marked as being exposable to the user interface.

Certain example embodiments include performing the traversing by operations including accessing attributes of a live data object of the plurality of live data objects, and determining, based on the accessed attributes, whether all connections to child live data objects of the live data object are traversable. The operations may also include, based on the determining (a) if all connections are traversable, traversing one or more child data objects of the live data object, and (b) if not all connections are traversable, traversing only child data objects of the live data object marked by a specific one of said attributes as being traversable.

Performing the generating may include adding to the graph shadow data objects corresponding to a particular live data object only when the particular data object has been traversed.

Certain example embodiments include performing the providing access by operations including accessing a shadow data object in the graph, and determining, based on a pre-specified listing of non-exposable objects or an attribute of the shadow data object, whether the shadow data object is exposable. The operations for performing the providing access may also include displaying aspects of the shadow data object on the user interface only if the shadow data object is, based on the determining, exposable.

According to certain embodiments the processing resources may be configured to control the system to perform operations comprising updating the generated graph when a change occurs in the plurality of live data objects in real-time.

In certain example embodiments, the updating includes performing the traversing and the generating at predetermined time intervals.

According to certain example embodiments the at least one processor is further configured to control the system to perform operations comprising receiving a query via the user interface, the query being associated with a shadow data object in the graph, accessing, by following a pointer in the shadow data object, a corresponding live data object, and outputting information regarding attributes of the accessed live data object via the user interface.

The at least one processor may be further configured to control the system to perform operations comprising causing aspects of a portion of the graph to be displayed via the user interface. The query may be associated with at least some of the displayed aspects.

An example method embodiment provides for observing an internal state of a software application executing in a runtime environment using at least one processor. The example method comprises traversing a structure of a plurality of live data objects in the software application executing in the runtime environment, generating a graph of shadow data objects based on the traversing, each shadow data object of the graph corresponding to a live data object of the executing software application, and providing access to the generated shadow graph via a user interface.

The generating a graph of shadow data objects may include forming each shadow object to include metadata associated with, and a pointer to, a respective corresponding live data object.

Each shadow data object in the graph may include a marking identifying whether or not the shadow object is exposable to the user interface, and the providing access may include providing access to attributes of only shadow data objects marked as being exposable to the user interface.

The traversing a structure of a plurality of live data objects may include accessing attributes of a live data object of the plurality of live data objects, and determining, based on the accessed attributes, whether or not all connections to child live data objects of the live data object are traversable. The traversing a structure of a plurality of live data objects may also include, based on the determining (a) if all connections are traversable, traversing one or more child data objects of the live data object, and (b) if not all connections are traversable, traversing only child data objects of the live data object marked by a specific one of said attributes as being traversable.

The providing access may include accessing a shadow data object in the graph, and determining, based on a pre-specified listing of non-exposable objects or an attribute of the shadow data object, whether or not the shadow data object is exposable. The traversing a structure of a plurality of live data objects may also include displaying aspects of the shadow data object on the user interface only if the shadow data object is, based on the determining, exposable.

Another example embodiment provides a non-transitory computer-readable storage medium having stored thereon computer program instructions that, when executed by a processor of computer, cause the computer to perform operations comprising traversing a structure of a plurality of live data objects in a software application executing in a runtime environment, generating a graph of shadow data objects based on the traversing, each shadow data object of the graph corresponding to a live data object of the executing software application, and providing access to the generated shadow graph via a user interface, in enabling observation of an internal state of the software application executing in the runtime environment.

In certain example non-transitory computer readable medium embodiments, generating a graph of shadow data objects may include forming each shadow object to include metadata associated with, and a pointer to, a respective corresponding live data object.

In certain example non-transitory computer readable medium embodiments, each shadow data object in the graph may include a marking identifying whether the shadow object is exposable to the user interface, and wherein the providing access includes providing access to attributes of only shadow data objects marked as being exposable to the user interface.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF CERTAIN EXAMPLE EMBODIMENTS

Certain example embodiments relate to techniques that provide for monitoring the structure and state of a live running program in a way that adds little or no overhead to the runtime environment. A live running program (also, interchangeably, live program, running program, executing program, executing software) is a program that is currently being executed by one or more processors of a computer system. The state of a live program includes the state of its objects and the interrelationships between those objects. Certain example embodiments may apply to any environment in which live running software programs are monitored. Certain example embodiments may be particularly beneficial in managed runtime environments executing program code written in interpreted programming languages. It will be appreciated, however, that embodiments are not limited to such programming languages and/or runtime environments.

Embodiments overcome numerous disadvantages of conventional debugging and/or introspection techniques, and provide for satisfying requirements for monitoring a running software program without significantly adding to its overhead, providing the user with a view that can be customized according to the user's specific monitoring needs, satisfying requirements for preventing the exposure of certain portions of the executing program and/or data structures, and for dynamically updating the user's view of the running program as the execution continues.

Certain example embodiments can have broad utility across all kinds of complex processing systems such as, for example, in health and status monitoring, performance analysis, speed of development, completeness of the solution, etc.

As noted above, some runtime environments provide introspection and/or reflection capabilities. These introspection and/or reflection runtime capabilities are used in embodiments to expose the live structure of a running program and also the state of each of the ADTs within the program through a separate shadow graph. This enables deep inspection of a running system while having little or no impact on runtime performance. Furthermore, the amount of the full structure exposed could be controlled in certain example embodiments at the source code level by allowing support for explicit and implicit tree definition, and by allowing the marking of certain structures as uninteresting or invisible.

Conventional techniques for monitoring live software include software debuggers and the JAVA language's built-in JAVA Management Extensions (JMX). JMX has been ported to a variety of other languages in order to take advantages of its wealth of client applications (e.g., PyMX for PYTHON, NetMX for C#/.NET, etc.).

Software debuggers of course allow the entirety of a running program to be examined, although often only if the program in question in stopped. Moreover, software debuggers impose a heavy cost in terms of runtime performance and can sometimes cause behavioral changes in the execution of a program. In addition, many debuggers are often suited for use only by users with a high-level of understanding as to how the inspected program is designed and implemented. One of the most sophisticated debugging environments is JAVA Platform Debugger Architecture by ORACLE, which defines components within the runtime environment, the communications protocol to clients, and the debugger front end which must be implemented.

As alluded to above, JMX is a JAVA language specification that has been co-opted for various other languages. It specifies the communications protocol used to interrogate and manipulate the JMX MBeans (software objects inside the client object). In the program, MBeans are defined at compile time and instantiated at runtime. MBeans publish a set of attributes, which are both readable and optionally writeable, as well as an optional set of operations. The MBeans are generally defined as an interface, with simple value data types (numbers, strings, etc.) accessible via naming convention (or more complicated configuration). MBeans do not provide the means to traverse connections between data structures, and indeed are separate constructs that may not have a one-to-one correspondence with live data structures.

Unfortunately, many types of conventional debugging are particularly ill-suited to examining a running production system, as debugging live software systems oftentimes incurs heavy penalties. First, there is significant cost to execution time when running in the debugger. Second, debuggers provide no way to remove portions of the running program from examination, which can be an issue in an environment with security concerns. Third, a debugger is not intended for live production usage, but rather for discovering problems in the running of program code. Indeed, much of debugging is more concerned with program instruction execution than state examination. These issues combine to remove debugging from many serious discussions of examining live software systems.

Furthermore, although JMX MBeans in many aspects provides an adequate technique for monitoring some aspects in a live software system, there nonetheless are several limitations to JMX MBeans. One limitation is that respective MBeans must be crafted for each collection of data that needs to be published.

For example, consider a software data structure such as: Class Vehicle {Integer numberOfWheels; Integer numberOfDoors; String color; Integer getNumberOfWheels( ) { . . . }; Integer getNumberOfDoors( ) { . . . }; String getColor( )}. By publishing an object with known method conventions (getXXX in this example), an object named "Vehicle" would be published with three attributes available for reading. If corresponding setXXX methods are defined in the class, updating of status is also supported in JMX MBeans.

This is a useful approach to publishing the status of specific objects, but it has many limitations such as, for example, limited scale, limited types of relations that can be monitored, providing only for publishing static structures, etc. With respect to the JMX limitations in scale, if a running system contains thousands of instances of the "Vehicle" objects, it is not possible to publish them all. In general, JMX is best suited for global health and status objects that report general state within the system. Additionally, since JMX MBeans are designed primarily to read status of objects, they are not well suited to traversing connections between software objects.

JMX also depends on registering JMX MBean objects with a runtime environment server, and is not amenable to rapid changes. With respect to the limited number of relations, JMX does not provide support for traversing relationships between objects. For example, if the "Vehicle" class also had an "Owner" field, which in turn contained "Name" and "Address" objects, JMX would allow one to retrieve those objects if and only if they were available directly at the "Vehicle" level.

Further, complex data types are hard to publish as attributes, because the client side generally needs access to the same compiled classes in order to preset those classes on the client. This is also problematic because for more complicated objects, where shipping the entire representation of a large complex object is not feasible. Moreover, JMX MBeans are primarily static, and the JMX specification does not provide for publishing a hierarchy of structures.

As noted above, however, certain example embodiments provide techniques for monitoring live software programs, while overcoming the above-described and/or other weaknesses of the conventional techniques discussed above. In certain example embodiments, a shadow graph representing the state of live objects (objects in the live software) and relationships between live objects is constructed, and an interface is provided for accessing the shadow graph, or portions thereof, for obtaining information regarding the live objects. The shadow graph may be formed as a tree data structure.

Figure 1A:
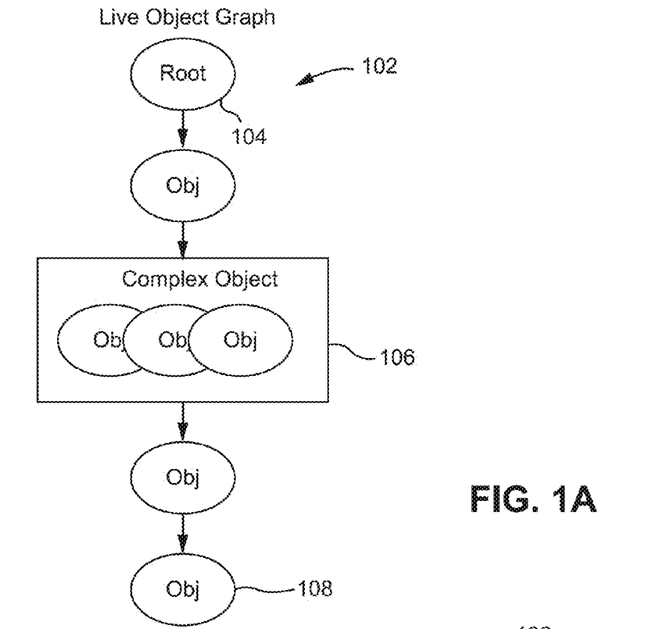
FIG. 1A is a live object graph representing objects in a running software system.
Figure 1B:
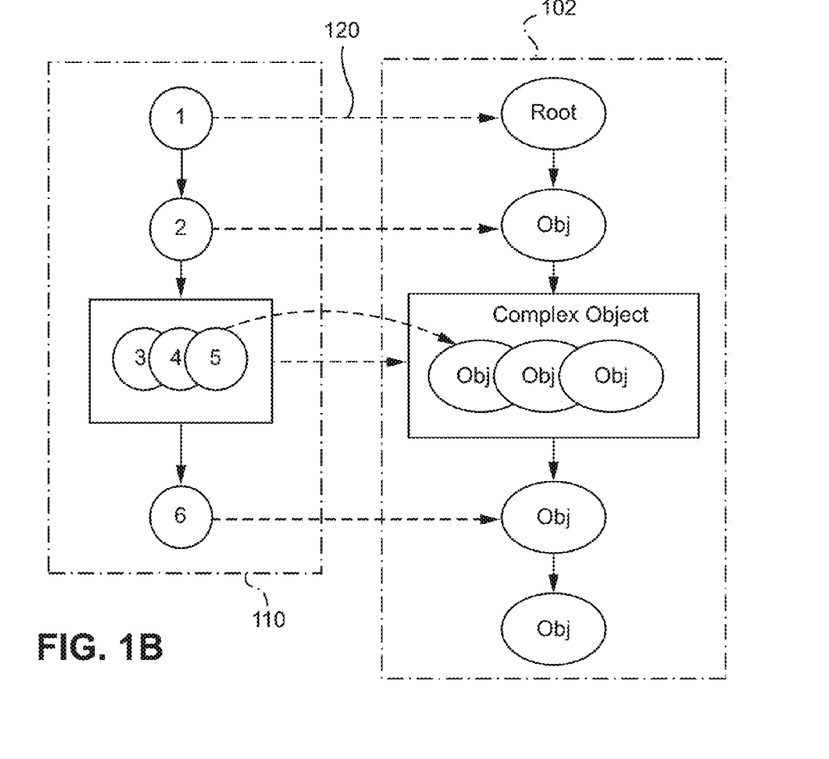
FIG. 1B illustrates a shadow graph, according to some example embodiments, corresponding to the live object graph shown in FIG. 1A.

Certain example embodiments identify a set of one or more "root" objects of the live software. Once these root objects are identified, each object (e.g., ADT) is traversed in order to construct the shadow graph. FIG. 1A is an example live object graph 102. Live object graph 102 is rooted at object 104 and includes a complex object 106. Complex object 106 includes a plurality of objects. FIG. 1B illustrates the shadow graph corresponding to the live object graph of FIG. 1A and the relationship between the objects represented as nodes in each graph. The shadow graph 110 includes a plurality of shadow objects, with each shadow object corresponding to a live object that has been traversed in the live object graph. Each dotted line arrow, such as dotted line arrow 120, indicates that a shadow object (e.g., at the tail end of the dotted line arrow) is determined based on a corresponding live object (e.g., at the head end of the dotted line arrow).

In certain example embodiments, each instance object of an ADT may be traversed in one of two ways. If only some (but not all) of the connections are explicitly marked as "traversable" or "connected", then only those connections that are explicitly marked are followed (e.g., traversed) to objects referenced by them. If no connections in the ADT are marked as traversable or connected, then all object references to other ADTs will be followed. As this traversal takes place, because live software object graphs often include cyclic aspects, some technique (e.g., a parallel graph) may be utilized to handle cases such as recursion.

Additionally, certain example embodiments may provide for excluding certain objects and/or object relationships from being exposed for monitoring. For example, certain objects may have been marked as "irrelevant", or may have been found either by data type or instance in a list of pre-specified blacklisted objects. The construction of the shadow graph is such that no corresponding shadow object is added for live objects specifically marked as excluded from monitoring. In this manner, the programmer can exercise control over the subset of the complete graph (e.g., representation of the complete live software program) that is exposed. The capability to mask the exposure of excessively numerous but not uninteresting portions of the object graph, or protected and/or sensitive parts of the data may be provided (e.g., one might keep social security numbers and/or other Personal Identification information from being exposed by the graph). In FIG. 1A, live node 108, the final live object in the live object graph, represents an example node that is marked as irrelevant. Consequently, as shown in FIG. 1B, no shadow node corresponding to live node 108 is added in the shadow graph 110.

The shadow graph produced by the traversal is a graph comprising metadata information such as packaging information, naming, etc., for objects in the live object graph. Each object in the shadow graph may also include a pointer to a corresponding live object. The shadow graph can then be used for lightweight navigation of the live object graph without actually touching the live objects. The term "touching" (e.g., programmatically accessing) is used herein to indicate that it is not necessary to access live objects in the live object graph during traversal of the shadow graph and/or shadow objects, in a manner that leads to the access to the live objects in memory being restricted in any way to other components. For example, access to the live objects to other components may be restricted when a particular live object or part thereof is locked for read and/or write by other components due to being accessed by the traversing program component through a corresponding shadow object.

When the initial traversal of the live object graph is done, it still remains subject to mutations. Several approaches are available to track mutations in the live object tree. First, the shadow tree could just be recalculated based on a timed interval. Such timed recalculation might prove expensive or, if the subset of the live objects was of reasonable size, might be reasonable. Alternatively, as mutations to the live graph happen, modifications to the shadow graph could be made as well through calls such as, for example, connect and disconnect calls.

Once the shadow graph is created, it can be used to answer a variety of questions. For example, any node in the shadow graph can be used to query its corresponding live object for state information. Using the earlier "Vehicle" example, any Vehicle object could be interrogated for the number of wheels or doors, or the name of the color. In certain example embodiments, any primitive data type that is available for reflection/introspection in the implementing language could be easily inspected.

Second, in certain example embodiments, relationships between complex objects (e.g., ADTs) can be examined. For example, by examining the state of an object, and then choosing to descend into its children, a process that is in some aspects like debugging could occur for a live running production system. This is different from the JMX design, where JMX is designed to move copies of objects across a network barrier and reconstitutes them for inspection. In certain example embodiments, the capability is provided to move around the graph in place.

Certain example embodiments may be implemented in a software environment with a minimal amount of reflection/introspection capabilities. An environment that provides (a) a mechanism to enumerate some combination of methods and/or variables for each ADT, and (b) a mechanism to invoke methods on an object arbitrarily (in a single threaded use case) or to simply read data values within ADTs, may be used in certain example embodiments. For instance, in JAVA, the Reflection Package provides a rich set of features to manipulate Object, Class, Method, and Field objects. Other managed runtime languages such as C#, RUBY, and PYTHON provide similar capabilities.

In unmanaged environments, such as C++ or C, certain example embodiments may add to objects explicit support to simulate reflection behavior. Such support, for example, could be implemented as a support library of functions.

Although many of the described embodiments use JAVA conventions for convenience, the teachings herein can be extended as needed for other languages and/or environments.

Figure 2A:
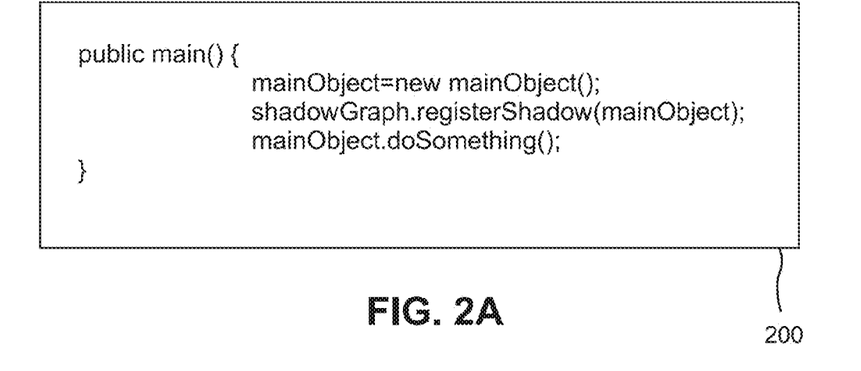
FIG. 2A is sample computer program code structure for forming a shadow graph, in accordance with certain example embodiments.

The traversal to build the shadow graph involves initially notating and traversing a root object. FIG. 2A is a sample computer program code structure 200 for initializing the shadow graph.

As represented in the computer program code structure 200, the main entry point of the program creates a main object as is the normal case for an object oriented program. This main object is then marked as a root by the call to the registerShadow( ) method. Then program execution proceeds as normal.

Figure 2B:
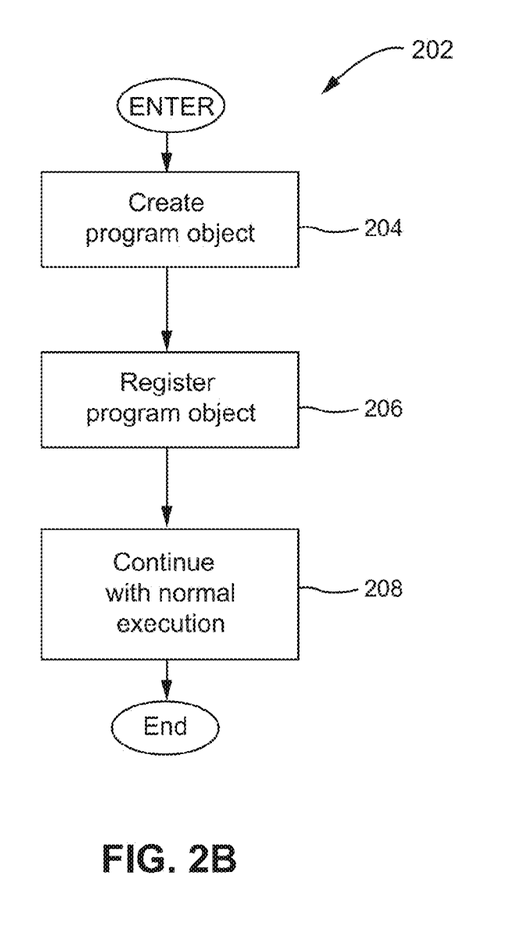
FIG. 2B is a flowchart of a sample process for forming a shadow graph, in accordance with certain example embodiments.

FIG. 2B is a flowchart representing the process 202 that would, for example, be carried out by one or more computer processors that execute code structure 200. After being initiated, step 202 creates a program object at step 204. At step 206, the created program object is registered. The program object represents the shadow graph. After the created program object is registered, process 202 continues with normal execution at step 208. During normal execution, the shadow graph is populated based on traversal of the live object graph. The shadow graph is rooted at the program object registered at step 206.

The shadow graph generation itself can be implemented, for example, in one of several ways, e.g., through complete traversal, through lazy traversal, etc. In order to perform a complete traversal, for example, the registerShadow( ) call shown in code structure 200 can be made on a pre-allocated shadowGraph object (e.g., shadowGraph object might be allocated globally, might be passed in, etc).

Figure 3A:
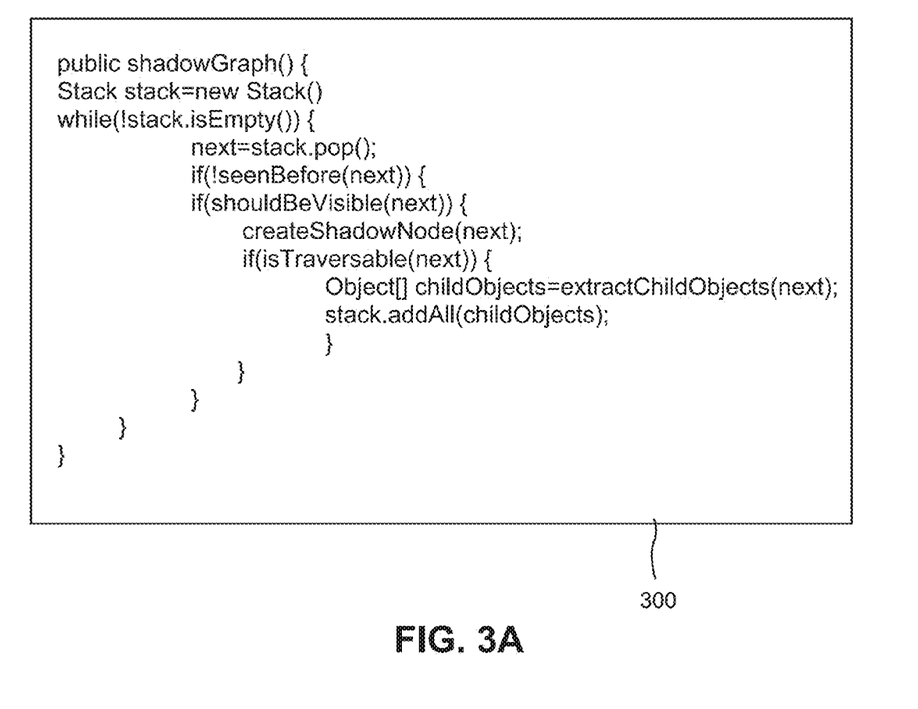
FIG. 3A is sample computer program code structure for traversing a shadow graph, in accordance with certain example embodiments.

FIG. 3A is a computer program code structure 300, in pseudocode, for an example algorithm for the complete traversal shadowGraph( ) method.

Program code structure 300 represents a depth first traversal of all connected objects in the live object graph. A supporting structure is implied by the !seenBefore( . . . ) construct, which determines whether the particular object being traversed has been previously encountered. The check whether an object has been previously encountered helps ensure that any single object is traversed only once during the traversal of the entire live object graph. The check can be implemented in a variety of ways, depending on the language and runtime environment. In certain example embodiments, the live objects themselves (e.g., an attribute of each object) may represent "seen" flags to be stored directly, or a table of previously seen objects can be kept.

Next, the program code structure 300 includes a shouldBeVisible(next) construct that determines, for each object being traversed, whether it can be exposed (e.g., made visible) to a user (e.g., a user who is monitoring the live state of the corresponding computer program). The check for the visibility of objects is an opportunity for specific objects to be blacklisted by type or instance. For example, in JAVA, an annotation could be used to mark classes as "irrelevant." In this case, the traversal would stop at this object (and any below it that are reached by traversing its connections). Certain example embodiments may enable the visibility to be allowed or disallowed at other levels of granularity than at the object level. For example, certain example embodiments may allow for certain connections of an object to be marked as not visible (e.g., irrelevant). Some other embodiments may enable groups of objects to be marked as not visible. For example, many modern languages have some sort of packaging structure (e.g., packages in JAVA, modules in PYTHON, etc.), and certain example embodiments may enable the marking of certain packages as blacklisted for visibility.

Returning to the program code structure 300, assuming a specific live object should be visible, the next step may be to create and record a shadow object (also referred to as "shadow node") corresponding to the live object. This shadow object may record a pointer to the live object, as well as various metadata. The amount and type of metadata can be specific to the language and/or the runtime environment in use, but may include aspects such as timestamp, object size, depth at which the object was found, etc. The shadow object would then be recorded in the shadowGraph repository as a node connected to the rest of the shadow graph.

After the shadow object is created, the live object may be tested for traversability as, for example, represented by the isTraversible( . . . ) construct in program code listing 300. For every method and attribute the object contains, some or all may be marked as non-traversable. In certain example embodiments, this marking may be performed via explicit method calls (e.g., in C/C++), Annotations (e.g., JAVA/C#), or other language-specific methods. In each case, the idea is to be able mark traversability at the class, instance, method and field level, so that fine-grain control over the graph construction is achieved in the source code directly. If some subset of all connected children objects is traversable, those children are pushed into the stack.

Note that there are a multitude of ways traversability could be captured such as, for example: (a) only explicitly marked child objects may be traversed; (b) all unmarked objects may be traversed; (c) only child objects of a certain type may be traversed; (d) only fields of a certain scope are traversable; and (e) only methods confirming of a certain naming convention are traversable. Certain example embodiments may employ one or more techniques that are different to those listed above.

After determining the next object to be traversed, as for example represented in the while( . . . ) construct in program code structure 300, the process continues until there are no more objects to process.

Figure 3B:
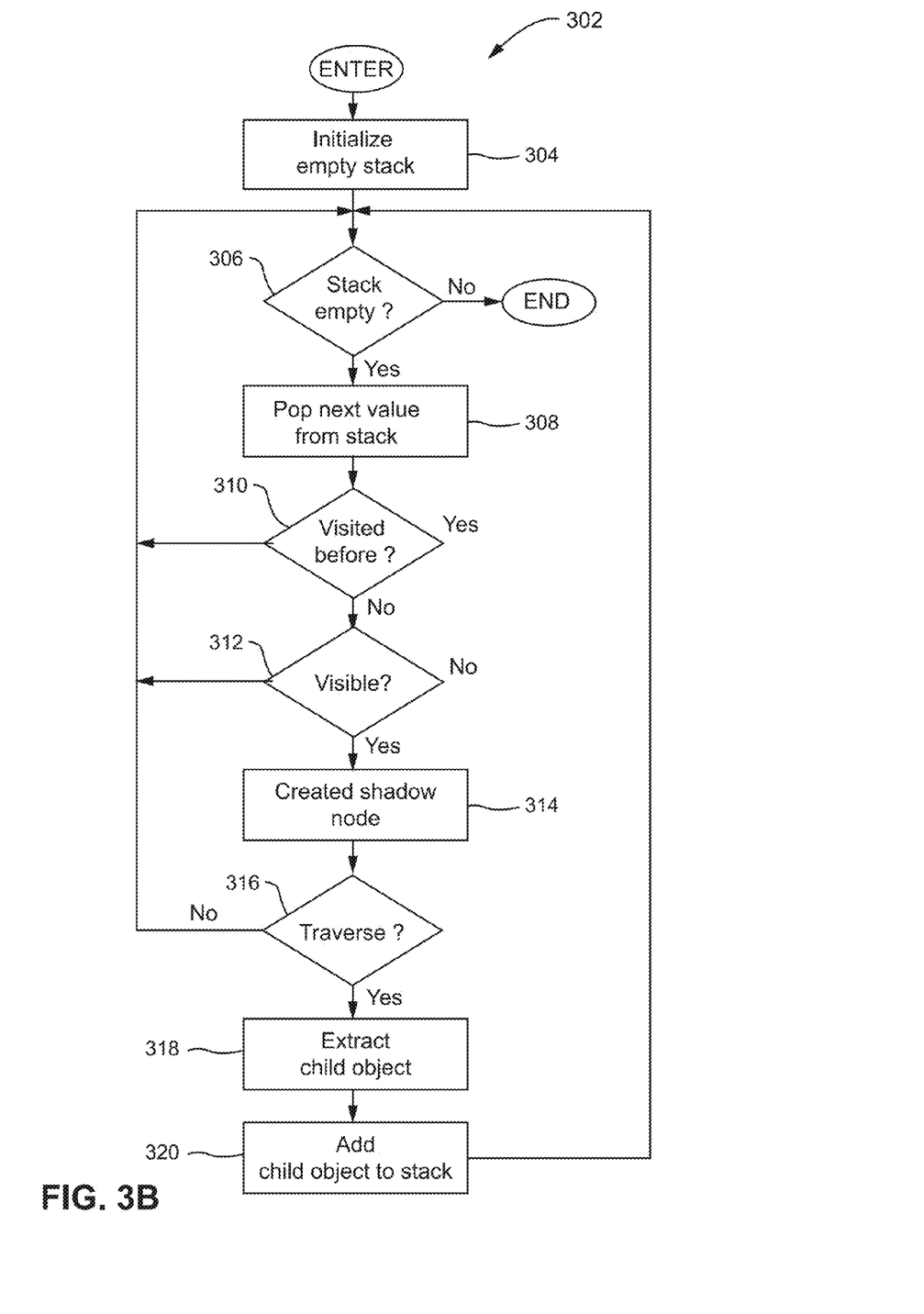
FIG. 3B is a flowchart of a sample process for traversing a shadow graph, in accordance with certain example embodiments.

FIG. 3B is a flowchart of a process 302 that represents the processing carried out by, for example, one or more processors executing the program code structure 300.

After entering process 302, at step 304, an empty stack is initialized. Initializing the stack may include populating the stack with a root object. A root object may be identified by analyzing the code. Any known technique for identifying a root object may be used in this operation. A root object represents the root in a live software graph of objects that are of interest to the user. In certain example embodiments, multiple roots objects may be identified in the same running program.

After the stack is initialized, steps 306-320 are then performed until the stack is determined to be empty. In brief, steps 306-320 perform the traversal of the live graph and the generation of the corresponding shadow graph.

At step 306, the stack is checked to see if it is empty. An empty stack indicates that the live graph has been completely traversed from the starting root object. If the stack is found to be empty, a complete shadow graph has been formed and process 302 may be ended.

If the stack is not empty, then at step 308, a next object to be traversed is popped from the stack.

At step 310, it is determined whether the popped object has been already visited during the traversal (e.g., !seenBefore( . . . ) construct in code structure 300). The determination may be based on an attribute value of the popped object, or a separately maintained list of already visited objects.

If the popped object is determined to have been already visited, then the popped object is discarded (e.g., ignored or not further considered for adding a corresponding object to the shadow graph), and process 302 returns to step 306. If, at step 310, it is determined that the popped object has not been visited before, then process 302 proceeds to step 312.

At step 312, a determination is made as to whether the popped object is allowed to be visible (e.g., shouldBeVisible( . . . ) construct in code structure 300). The determination of visibility may be based on one or more attributes of the popped object or on a separately maintained list (e.g., a blacklist) of objects, types of objects, and/or groups of objects that are not to be exposed to users.

If it is determined at step 312 that the popped object is not allowed to be visible, then the popped object is discarded (e.g., ignored or not further considered for adding a corresponding object to the shadow graph), and process 302 returns to step 306. If, at step 312, it is determined that the popped object can be visible, then process 302 proceeds to step 314.

At step 314, a shadow object corresponding to the popped node is added to the shadow graph. As noted above, the shadow object may include metadata with respect to selected aspects of the popped object. The shadow object may also include a pointer to the popped object in the live object graph. Any suitable known technique for adding a nodes to a graph may be used for adding the shadow object to the shadow graph.

After the shadow object is added, a determination is made as to whether the popped object should be traversed. In the case that the popped node has no child connections, process 302 returns to step 306. The determination of whether to traverse the popped object may be based on one or more attributes of the popped object. For example, in certain example embodiments, if the popped object has selectively marked certain of the connections (e.g., child objects) as being traversable, then the popped node can be traversed, and only the connections so marked will be traversed. If one or more child connections exist, but none are specifically marked for traversal, all the child connections may be traversed. If the popped node is traversable, then at step 318 child object(s) are extracted and at step 320 the extracted child object(s) is/are added to the stack. After step 320, process 302 proceeds to step 306.

The above description of process 302 represents the generation of a shadow graph corresponding to one root node. Multiple shadow graphs corresponding to respective root nodes may be constructed in certain example embodiments, e.g., depending on the live runtime environment being monitored. It should be noted that process 302 may be performed, in certain example embodiments, with one or more operations in addition to, or in place of, steps 304-320, and that one or more of steps 304-320 may be performed in an order that is different from that shown in FIG. 3B.

The shadow graph object itself is the entry point for walking and interrogating the live object graph. In certain example embodiments, at a minimum the shadow graph object provides methods/functions such as, for example: (a) getRootNode( ) for returning the root shadow node of the live object tree; (b) getParentNode( ) for returning the parent shadow node, or null if no parent exists (e.g., root); (c) getChildrenOf(node) for returning a set of children traversable from the specified node, or an empty set if the node is not traversable; (d) getAttributesOf(node) for returning a set of NodeAttribute objects which may, for example, contain the name of the attribute, and such useful metadata such as whether it came from a field or method, the attributes type, etc.; (e) getAttributeValue(node, nodeAttribute) for returning the value of a specific attribute in the live object; and/or the like. The returning the value of attribute in the live object may be performed in a number of ways, e.g., depending on the platform. For example, the NodeAttribtue objects might themselves provide access.

Figure 4A:
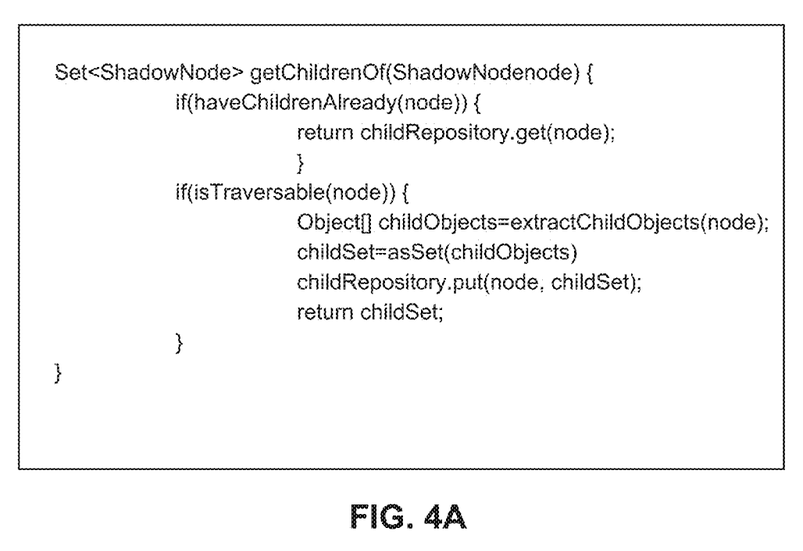
FIG. 4A is sample computer program code structure for another technique for traversing a shadow graph, in accordance with certain example embodiments.
Figure 4B:
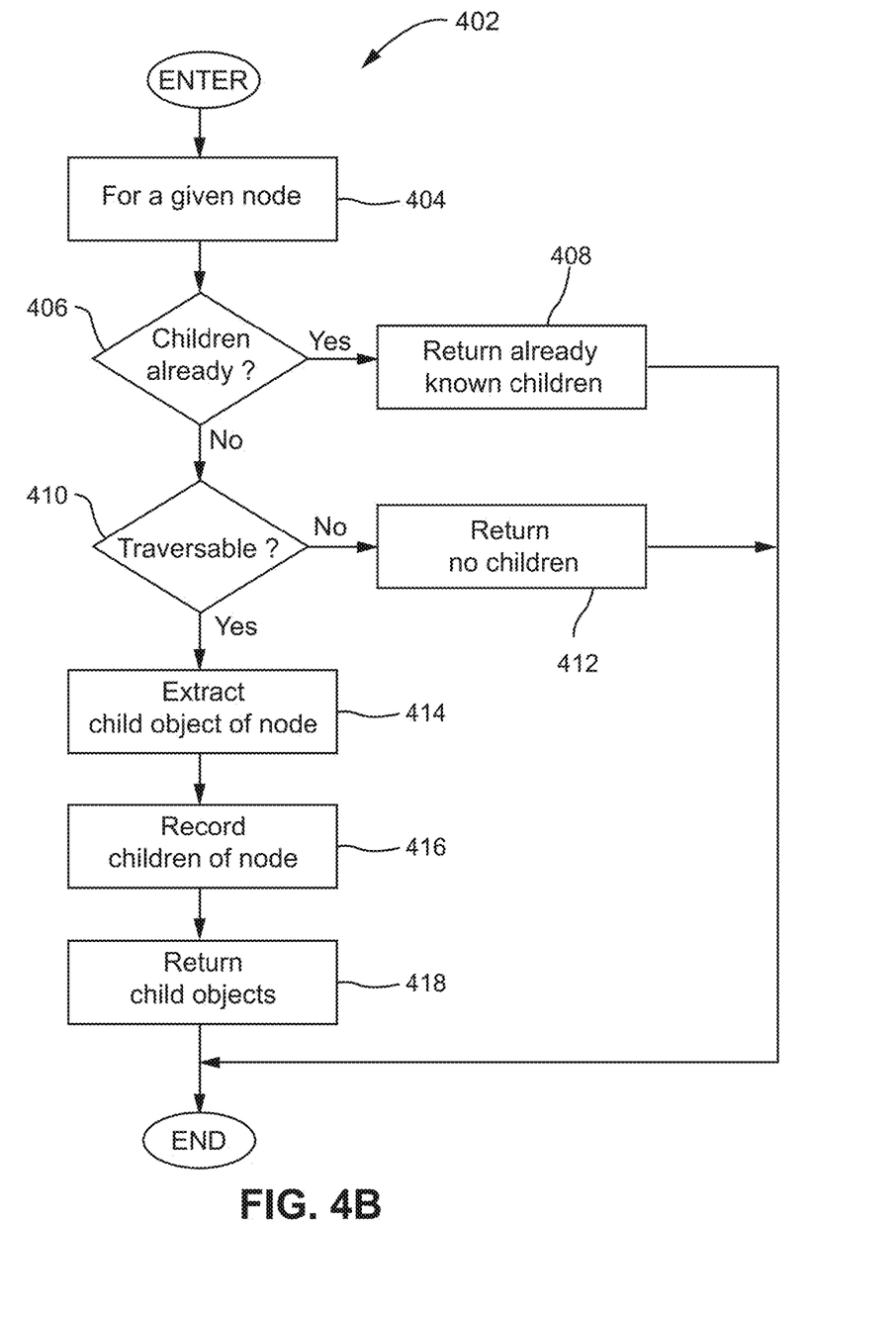
FIG. 4B is a flowchart of another sample process for traversing a shadow graph, in accordance with certain example embodiments.

As noted above, instead of the depth first traversal illustrated in FIGS. 3A-B, a lazy traversal may be performed to generate the shadow graph. FIGS. 4A and 4B illustrate a lazy traversal. In the lazy traversal case, the shadow graph itself functions as the stack. For example, upon each call to getChildrenOf( ) in the shadow graph object, processing corresponding to the inside of the while( ) loop in code structure 300 would be executed if needed. Thus, getChildrenOf( ) may include, for example, a program code structure 400 shown in FIG. 4A.

In code structure 400, the getChildrenOf( ) method uses a supporting data structure to map nodes to child objects. This implementation may be lighter than the depth first traversal shown in FIGS. 3A-B in terms of computation cost initially, by deferring the tree construction until the data is requested, at the added expense of having to do the traversal when requested.

FIG. 4B illustrates a flowchart for a process 402 that may be carried out by one or more processors to perform, for example, the code structure 400. After process 402 is entered, at step 404, a node being currently processed is identified. For example, the node being currently processed in an iteration of process 402 may be the object of the shadow graph that is passed as the argument to the getChildrenOf( ) method shown in FIG. 4A.

At step 404, a determination is made as to whether the node being currently processed has children that have already been identified and added to the repository. If the children are already in the repository (e.g., haveChildrenAlready( ) returns true in code structure 400), then those children are returned at step 408 (e.g., childRepository .get( ) in code structure 400) and process 402 is exited. If a determination is made at step 406 that the children are not already in the repository, process 402 proceeds to step 410.

At step 410, a determination is made as to whether the node being currently processed is traversable (e.g., isTraversable( ) in code structure 400). If the node does not have children, then at step 412, no children are returned and process 402 is exited. If there is at least one child node, process 402 proceeds to step 414 where child object(s) is/are extracted (e.g., extractChildObjects( ) in code structure 400). At step 416, the child object(s) is/are added to the repository, and the child objects are returned at step 418 before exiting the process.

It should be noted that process 402 may be performed, in some embodiments, with one or more operations in addition to, or in place of, steps 404-418, and that one or more of steps 404-418 may be performed in an order that is different from that shown in FIG. 4B.

In certain example embodiments, a variation of process 402 may not use the supporting data structure to save children at all, and perform every interrogation live. This technique may have additional computational overhead compared to process 402, but has an advantage of being lighter on memory.

In yet other embodiments, a mix of two or more of processes 302, 402, and/or variants thereof may be performed. Depending on the system under inspection, any of these three tree-building methods could be optimal, depending on the size, rate of change, complexity of the live object graph, etc.

Certain example embodiments include user interfaces (e.g., client frontends) through which the information regarding the live software programs are presented to one or more users interactively. Once the shadow tree is constructed, there are many ways by which the information can be usefully exposed to a user such as, for example, by logging to a file system, exposing through an in-process user interface, being made available through a network protocol like REST (which is an HTTP-based approach to providing simple remote access to systems), etc.

Figure 5:
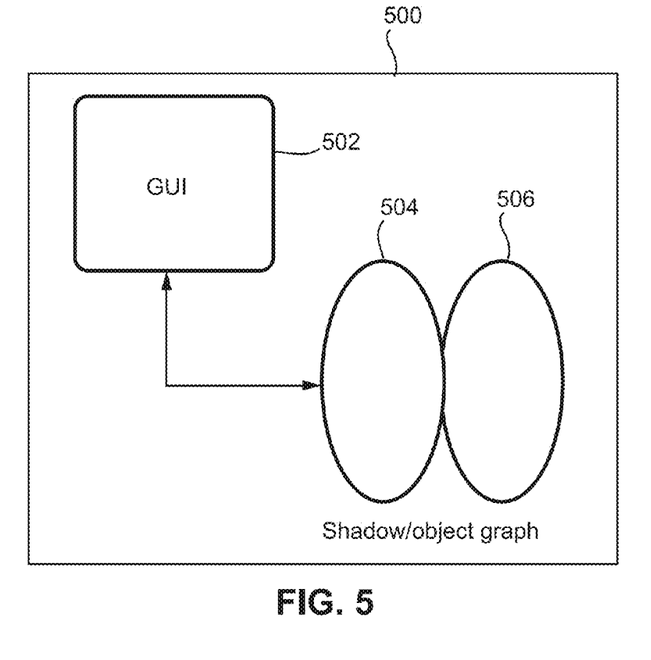
FIG. 5 is a schematic view of an in-process/GUI based interface, according to certain example embodiments.

FIG. 5 is a schematic view of an in-process/GUI based interface with process logging under certain conditions. A program (e.g., a client program) may either be a non-graphical program that can be run in a graphical environment, already a graphical program, etc. Regardless, the technique according to certain example embodiments exposes an object hierarchy through a graphical user interface as illustrated in FIG. 5. FIG. 5 schematically illustrates an association between a GUI 502 and shadow graph 504, through which GUI 502 may present to a user information about live object graph 506.

The GUI 502 initially, upon invocation, may display the root (assuming a single root for this case) of the shadow graph. No parent is displayed for the root. It would however display the current root object (e.g., in the form of an object representing a toolbox). The displayed root object would also have a user interface object for choosing to navigate to children, such as a pulldown (e.g., with the choices expanded for clarity here).

Figure 6:
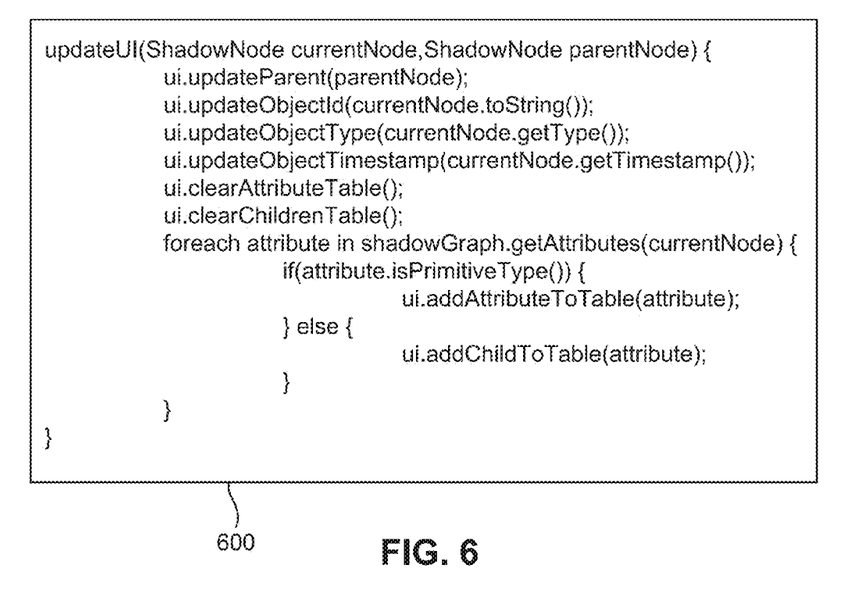
FIG. 6 is program code structure for updating a user interface, according to certain example embodiments.

A method such as program code structure 600 shown in FIG. 6 may be used for updating the user interface. Program code structure 600 can be called in relation to each object displayed on the user interface, and populates a user interface with attributes and child objects of the current node.

Figure 7:
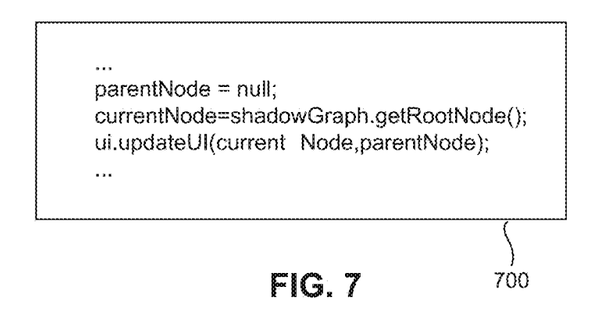
FIG. 7 is program code structure for obtaining root information, according to certain example embodiments.

A method such as program code structure 700 shown in FIG. 7 may be used to fetch the root and its information. Basically, program code 700 can be used for obtaining the root object of the shadow graph, and for updating the user interface with the obtained root object.

Figure 8:
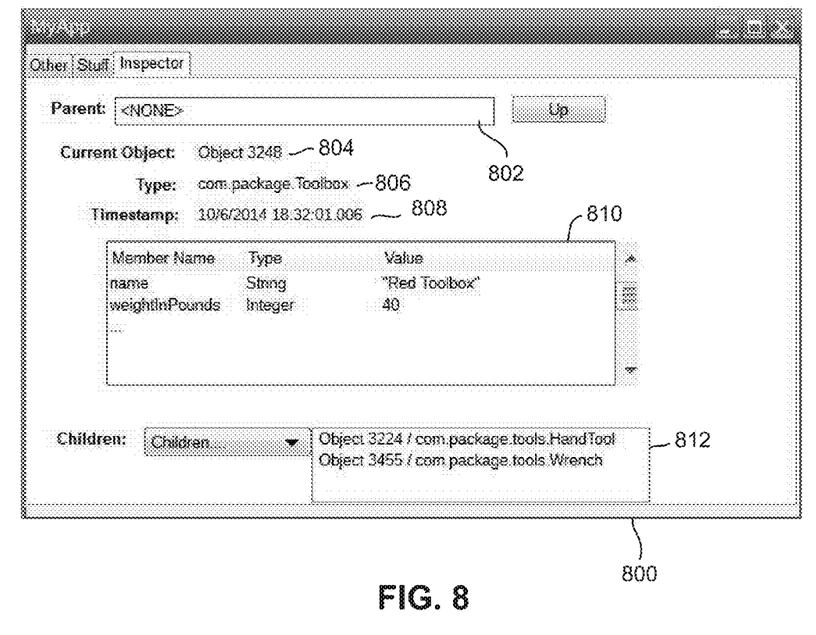
FIG. 8 is a schematic view of user interface, according to certain example embodiments.

FIG. 8 illustrates a display 800 of user interface with, for example, information obtained using code structure 700. The display 800 may display parent information in a display field 802, current object name information 804, packaging information 806, timestamp 808 representing the time at which the object information was obtained or last updated, member (e.g., attribute) information 810, and child information 812.

Figure 9:
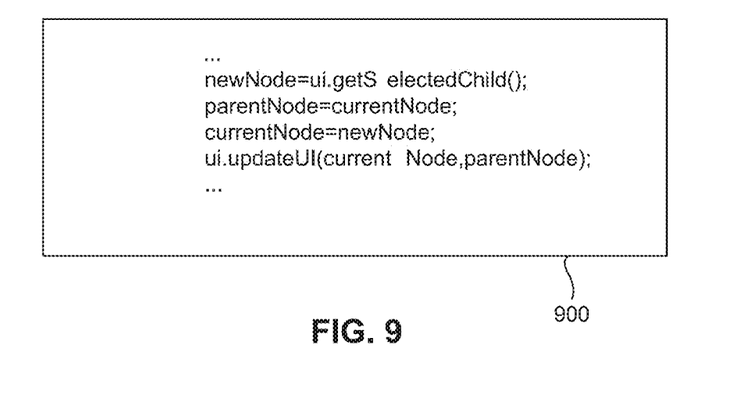
FIG. 9 is program code structure for obtaining traversal information for the user interface using the shadow tree, according to certain example embodiments.

Next, suppose the user wanted to further inspect a HandTool object (not shown in FIG. 8) reachable from the root Toolbox object (e.g., 806 in FIG. 8). By selecting a Hammer HandTool object, for example, in a displayed portion (not shown) of the shadow graph, the pseudocode structure 900 shown in FIG. 9 may be executed.

The display 800 may enable data entry via any means such as, for example, by keyboard, mouse, touchscreen, etc. Pulldown menus and/or the like may be used to make the data entry process easier and more accurate.

Figure 10:
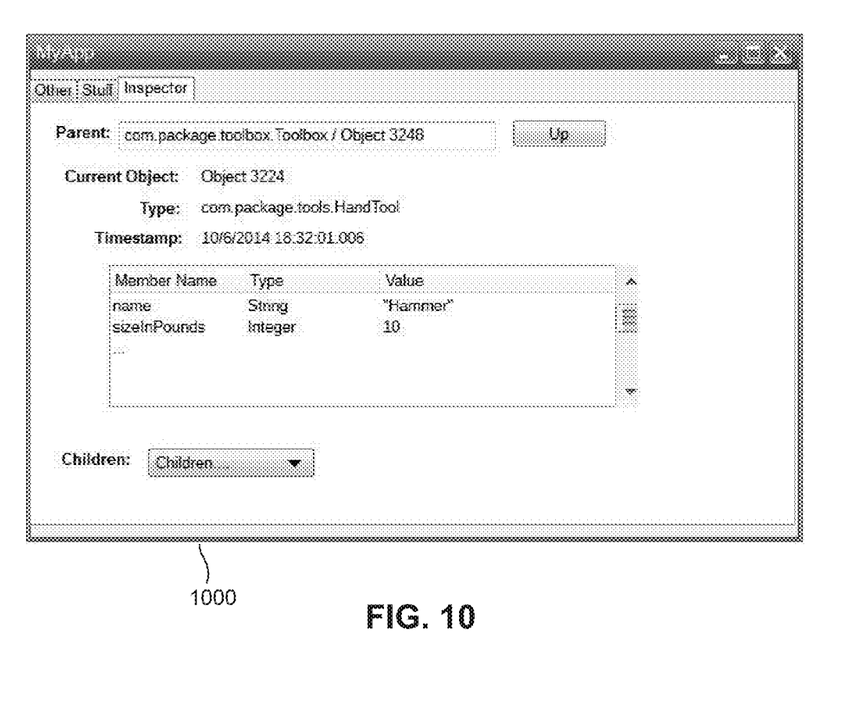
FIG. 10 is another schematic view of a user interface, according to certain example embodiments.

FIG. 10 is a display 1000 of the user interface. A comparison of FIGS. 8 and 10 illustrates how object information has been updated in the various display fields. In FIG. 10, display field corresponding to display field 802 shown in FIG. 8 has been updated to represent object 3248 as the parent object of the currently displayed 3224 object (shown in a display field corresponding to display field 804 in FIG. 8), the display field corresponding to display field 806 in FIG. 8 indicates the current object is from a HandTool package, and the display field corresponding to field 808 in FIG. 8 illustrates the attributes of the current object.

In FIG. 10, it can be seen that the HandTool has some primitive inspectable types, such as a name and a sizeInPounds. Being able to walk an object graph in the manner described above, and inspect live data with little overhead, while keeping the construction of the graph under control at a programmatic level, as provided for by certain example embodiments, can be of great benefit.

In this regard, there are many real-world usages for a system that allows for the exposure of deep information in a running system with minimal overhead. In one example application, in a communications system such as a cell phone switching system, a purpose-built user interface could use certain example embodiments described herein to monitor the contents of the in-progress call tables under load. Such monitoring could be very useful for debugging a resource leak that only evidenced under real-world load, where an actual debugger would be too intrusive, and would probably need recompilation of the process. And because of the dynamic nature of such a system, the call tables could be drilled into by traversal to expose, interrogate, and enable analysis of the really important data without disrupting the system.

Many systems and/or applications that cannot afford downtime for debugging or extensive overhead because of performance constraints also may be good candidates for the example techniques set forth herein. For instance, any real-time, high-performance system that evidences a software bug that only shows up under load could be a good candidate.

Certain example embodiments can also operate as a dynamic statistics portal. For instance, consider a customer call center application. A monitoring system could be implemented that uses the shadow graph to monitor the call rates in aggregate, until a certain condition is met, such as the call rate passing a certain threshold. Above the threshold, the monitoring system could escalate by sending an email or text messages that the system is experiencing load. Further, it could reach into the call records to ascertain the types of calls being fielded, and automatically categorize them and email or text message them to the on-call staff. It will be appreciated that there is tiny overhead until the anomalous condition is noted; then, the warning software can reach deep into the system and examine call records in a focused manner, providing useful information without disruptive overhead.

Although certain example embodiments have been described in connection with JAVA and like languages, it will be appreciated that these languages are merely examples may or may not necessarily correspond to a programming language that is used (or is to be used) in a real system or all embodiments of this invention. Instead, it will be appreciated that the example techniques described herein are not dependent on any specific programming language and/or runtime environment.

A description of certain terms is provided below for aiding in the understanding of how certain example embodiments may operate. However, it is to be understood that the following descriptions are provided by way of example for explanatory purposes and should not be construed as being limiting on the claims, unless expressly noted.

| Term | Example Description |
| --- | --- |
| Managed Runtime Environment | A class of software platforms where software programs are run in a well defined controlling environment. Examples include JAVA, PYTHON, C#, RUBY, etc. |
| Reflection/ Introspection | A process where a live software object in can be interrogated for its structure (possibly including but not limited to methods, class hierarchy, fields, etc.) and that structure can then be used to read information about the objects state, and its relationships to other live objects. This is a feature of many Managed Runtime Environments. |
| Terracotta Big Memory | A feature that allows large (and possibly serializable) objects to be stored in an off-heap memory cache. Software AG/Terracotta's Big Memory feature may be used in connection with the parsed data store of certain example embodiments. See, for example, U.S. Pat. No. 8,832,674, the entire content of which is hereby incorporated herein by reference. |

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor (e.g., central processing unit (CPU) or specialized processor) execute instructions that may be tangibly stored on a computer readable storage medium. In this regard, the system under test may be performed (e.g., executed from binary code or interpreted from a higher-level language) in connection with a computer system including at least one processor and a memory, and the program code structures disclosed herein may be executed on the same computer systems and/or different computer systems that are operably connected to and able to gather information from those computer systems. Cloud-based storage and/or execution also is included.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for observing an internal state of a software application executing in a runtime environment, the system comprising:
processing resources including memory and at least one processor, the processing resources being configured to control the system to perform operations comprising:
traversing a structure of a plurality of live data objects in the software application executing in the runtime environment, the structure including one or more first live data objects each corresponding to a respective attribute or method of a second live data object, wherein the first and second live data objects are from the plurality of live data objects;
generating a graph of shadow data objects based on the traversing, each shadow data object of the graph corresponding to a live data object of the executing software application, wherein one or more first shadow data objects each corresponding to a respective one of the first live data objects are arranged in the graph as child nodes of a second shadow data object which corresponds to the second live data object; and
providing access to the generated shadow graph via a user interface, so that information regarding the plurality of live data objects is accessible through the shadow graph during said executing.

2. The system according to claim 1, wherein the at least one processor is further configured to control the system to perform the generating including forming each shadow object to include metadata associated with, and a pointer to, a respective corresponding live data object.

3. The system according to claim 2, wherein the metadata includes aspects of naming of the corresponding live data object.

4. The system according to claim 2, wherein the metadata includes identification of aspects of packaging of the corresponding live data object.

5. The system according to claim 1, wherein each shadow data object in the graph includes a marking identifying whether the shadow object is exposable to the user interface, and wherein the providing access includes providing access to attributes of only shadow data objects marked as being exposable to the user interface.

6. The system according to claim 1, wherein the at least one processor is further configured to control the system to perform the traversing including:
accessing attributes of a live data object of the plurality of live data objects;
determining, based on the accessed attributes, whether all connections to child live data objects of the live data object are traversable, wherein at least one of said accessed attributes corresponds to one of said child live data objects; and
based on the determining (a) if all connections are traversable, traversing one or more child data objects of the live data object, and (b) if not all connections are traversable, traversing only child data objects of the live data object marked by a specific one of said attributes as being traversable.

7. The system according to claim 6, wherein the at least one processor is further configured to control the system to perform the generating including adding to the graph shadow data objects corresponding to a particular live data object only when the particular data object has been traversed.

8. The system according to claim 1, wherein the at least one processor is further configured to control the system to perform the providing access including:
accessing a shadow data object in the graph;
determining, based on a pre-specified listing of non-exposable objects or an attribute of the shadow data object, whether the shadow data object is exposable; and
displaying aspects of the shadow data object on the user interface only if the shadow data object is, based on the determining, exposable.

9. The system according to claim 1, wherein the at least one processor is further configured to control the system to perform operations comprising updating the generated graph when a change occurs in the plurality of live data objects in real-time.

10. The system according to claim 9, wherein the updating includes performing the traversing and the generating at predetermined time intervals.

11. The system according to claim 1, wherein the at least one processor is further configured to control the system to perform operations comprising:
receiving a query via the user interface, the query being associated with a shadow data object in the graph;
accessing, by following a pointer in the shadow data object, a corresponding live data object; and
outputting information regarding attributes of the accessed live data object via the user interface.

12. The system according to claim 11, wherein the at least one processor is further configured to control the system to perform operations comprising causing aspects of a portion of the graph to be displayed via the user interface,
wherein the query is associated with at least some of the displayed aspects.

13. A method for observing an internal state of a software application executing in a runtime environment using at least one processor, the method comprising:
traversing a structure of a plurality of live data objects in the software application executing in the runtime environment, the structure including one or more first live data objects each corresponding to a respective attribute or method of a second live data object, wherein the first and second live data objects are from the plurality of live data objects;
generating a graph of shadow data objects based on the traversing, each shadow data object of the graph corresponding to a live data object of the executing software application, wherein one or more first shadow data objects each corresponding to a respective one of the first live data objects are arranged in the graph as child nodes of a second shadow data object which corresponds to the second live data object; and
providing access to the generated shadow graph via a user interface, so that information regarding the plurality of live data objects is accessible through the shadow graph during said executing.

14. The method according to claim 13, wherein the generating includes forming each shadow object to include metadata associated with, and a pointer to, a respective corresponding live data object.

15. The method according to claim 13, wherein each shadow data object in the graph includes a marking identifying whether or not the shadow object is exposable to the user interface, and wherein the providing access includes providing access to attributes of only shadow data objects marked as being exposable to the user interface.

16. The method according to claim 13, wherein the traversing includes:
  accessing attributes of a live data object of the plurality of live data objects;
  determining, based on the accessed attributes, whether or not all connections to child live data objects of the live data object are traversable, wherein at least one of said accessed attributes corresponds to one of said child live data objects; and
  based on the determining (a) if all connections are traversable, traversing one or more child data objects of the live data object, and (b) if not all connections are traversable, traversing only child data objects of the live data object marked by a specific one of said attributes as being traversable.

17. The method according to claim 13, wherein the providing access includes:
  accessing a shadow data object in the graph;
  determining, based on a pre-specified listing of non-exposable objects or an attribute of the shadow data object, whether or not the shadow data object is exposable; and
  displaying aspects of the shadow data object on the user interface only if the shadow data object is, based on the determining, exposable.

18. A non-transitory computer-readable storage medium having stored thereon computer program instructions that, when executed by a processor of computer, cause the computer to perform operations comprising:
  traversing a structure of a plurality of live data objects in a software application executing in a runtime environment, the structure including one or more first live data objects each corresponding to a respective attribute or method of a second live data object, wherein the first and second live data objects are from the plurality of live data objects;
  generating a graph of shadow data objects based on the traversing, each shadow data object of the graph corresponding to a live data object of the executing software application, wherein one or more first shadow data objects each corresponding to a respective one of the first live data objects are arranged in the graph as child nodes of a second shadow data object which corresponds to the second live data object; and
  providing access to the generated shadow graph via a user interface, in enabling observation of an internal state of the software application executing in the runtime environment.

19. The non-transitory computer-readable storage medium according to claim 18, wherein the generating includes forming each shadow object to include metadata associated with, and a pointer to, a respective corresponding live data object.

20. The non-transitory computer-readable storage medium according to claim 18, wherein each shadow data object in the graph includes a marking identifying whether the shadow object is exposable to the user interface, and wherein the providing access includes providing access to attributes of only shadow data objects marked as being exposable to the user interface.

* * * * *